(12) United States Patent
Darroman et al.

(10) Patent No.: US 7,902,692 B2
(45) Date of Patent: Mar. 8, 2011

(54) INVERTER SYSTEM

(75) Inventors: Yann Darroman, Barcelona (ES); Ignacio Alvarez-Troncosco, Valls Tarragona (ES)

(73) Assignee: Lear Corporation, Southfield, MI (US)

( * ) Notice: Subject to any disclaimer, the term of this patent is extended or adjusted under 35 U.S.C. 154(b) by 131 days.

(21) Appl. No.: 11/677,660

(22) Filed: Feb. 22, 2007

(65) Prior Publication Data

US 2008/0205086 A1     Aug. 28, 2008

(51) Int. Cl.
*B60L 1/00*     (2006.01)
(52) U.S. Cl. .................................................. 307/10.1
(58) Field of Classification Search .............. 307/10.1, 307/11
See application file for complete search history.

(56) References Cited

U.S. PATENT DOCUMENTS

| | | | |
|---|---|---|---|
| 5,646,459 A * | 7/1997 | Hatate et al. ................. 307/85 |
| 5,939,800 A * | 8/1999 | Artinian et al. ................ 307/64 |
| 6,369,461 B1 * | 4/2002 | Jungreis et al. ................ 307/46 |
| 6,459,175 B1 | 10/2002 | Potega |
| 6,462,976 B1 | 10/2002 | Olejniczak et al. |
| 6,624,533 B1 | 9/2003 | Swanson et al. |
| 6,833,206 B2 | 12/2004 | Erdle et al. |
| 7,002,265 B2 | 2/2006 | Potega |
| 7,057,376 B2 | 6/2006 | Cook et al. |
| 7,274,116 B2 * | 9/2007 | Inoue et al. .................. 307/100 |
| 7,279,805 B2 * | 10/2007 | Senda et al. ................ 307/10.1 |
| 7,336,510 B2 * | 2/2008 | Ely et al. ......................... 363/49 |
| 7,701,079 B2 * | 4/2010 | O'Gorman et al. .......... 307/10.1 |
| 2002/0196001 A1 | 12/2002 | Morgen |
| 2003/0085621 A1 | 5/2003 | Potega |
| 2003/0090225 A1 | 5/2003 | Posma et al. |
| 2004/0112320 A1 | 6/2004 | Bolz et al. |
| 2004/0262058 A1 * | 12/2004 | Boltze et al. ................ 180/65.3 |
| 2005/0088866 A1 | 4/2005 | Levine |
| 2005/0151517 A1 | 7/2005 | Cook et al. |
| 2006/0006007 A1 | 1/2006 | Ernest et al. |

FOREIGN PATENT DOCUMENTS

WO     2007018223 A1     2/2007

OTHER PUBLICATIONS

China Office Action for corresponding China Application No. 2008100003381, mailed Oct. 23, 2009, 7 pages.

* cited by examiner

*Primary Examiner* — Michael Rutland Wallis
(74) *Attorney, Agent, or Firm* — Brooks Kushman P.C.

(57) ABSTRACT

A vehicle system for use in powering an AC load. The system may included an inverter system operating in cooperation with a power distribution system. The power distribution system may be configured to provide a stabilized power output to the inverter system. The inverter system be configured to inverter the stabilized power output to an output suitable for powering the AC load.

7 Claims, 2 Drawing Sheets

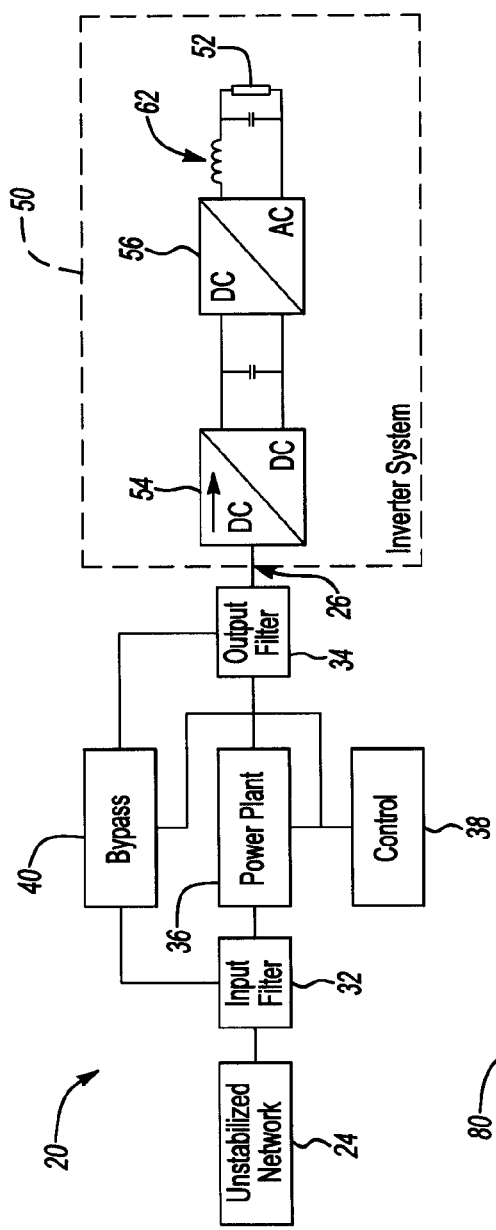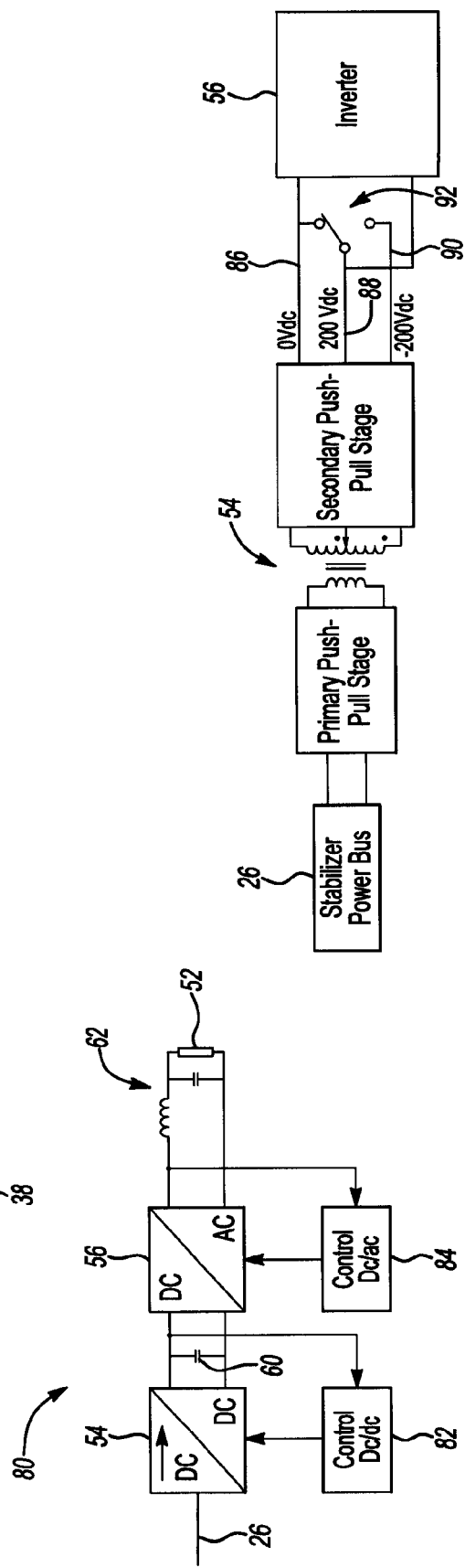

INVERTER SYSTEM

BACKGROUND OF THE INVENTION

1. Field of the Invention

The present invention relates to a vehicle inverter suitable for use in powering appliances, such as AC driven domestic appliances.

2. Background Art

As hybrid electric vehicle (HEV) and electric vehicle (EV) technology may be adapted to support full and partial electric drive operations in any number of vehicles, such as but not limited to HEV and EV technology in automobiles having internal combustion engines. These technologies may include advantageous electrical capabilities, such as but not limited to regenerative braking, automatic engine stop/start operation, and the like. These electrical capabilities, however, tend to introduce voltage variations in the electrical system, which are different from non-electrically driven/assisted vehicles. This present problems different from those typically found in a constant voltage vehicle systems, like internal combustion automobiles.

FIG. 1 illustrate a graph 10 of electrical variations commonly associated with HEV and EV technology and its result on battery voltage. The graph generally illustrates electrical variations influencing capabilities of a vehicle battery to provide a constants 12.8V. One variation may result from battery discharge during acceleration, another variation may result from battery charging during deceleration (regeneration), another variation may result from automatic engine shutdown after vehicle stop, another variation may result from battery discharge during a vehicle stop phase, another variation may result from hot engine restart or engine start/stop during engine standstill, and yet another variation may results from controlled battery charging.

These and other voltage variations can be problematic and disruptive to vehicle systems and other vehicle loads subjected to the same, such as but not limited to voltage sensitive loads, like instrument panels, entertainment systems, lighting systems, etc. To facilitate customer acceptance of the HEV and EV technologies, it may be desirable to avoid or limit noticeable performance variations in voltage sensitive loads.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 3 illustrates integration of an inverter system in accordance with one non-limiting aspect of the present invention;

FIG. 4 illustrates a controlled inverter system in accordance with one non-limiting aspect of the present invention; and FIG. 5 illustrates a system of switching converter output in accordance with one non-limiting aspect of the present invention.

DETAILED DESCRIPTION OF THE PREFERRED EMBODIMENT(S)

Figure 1:
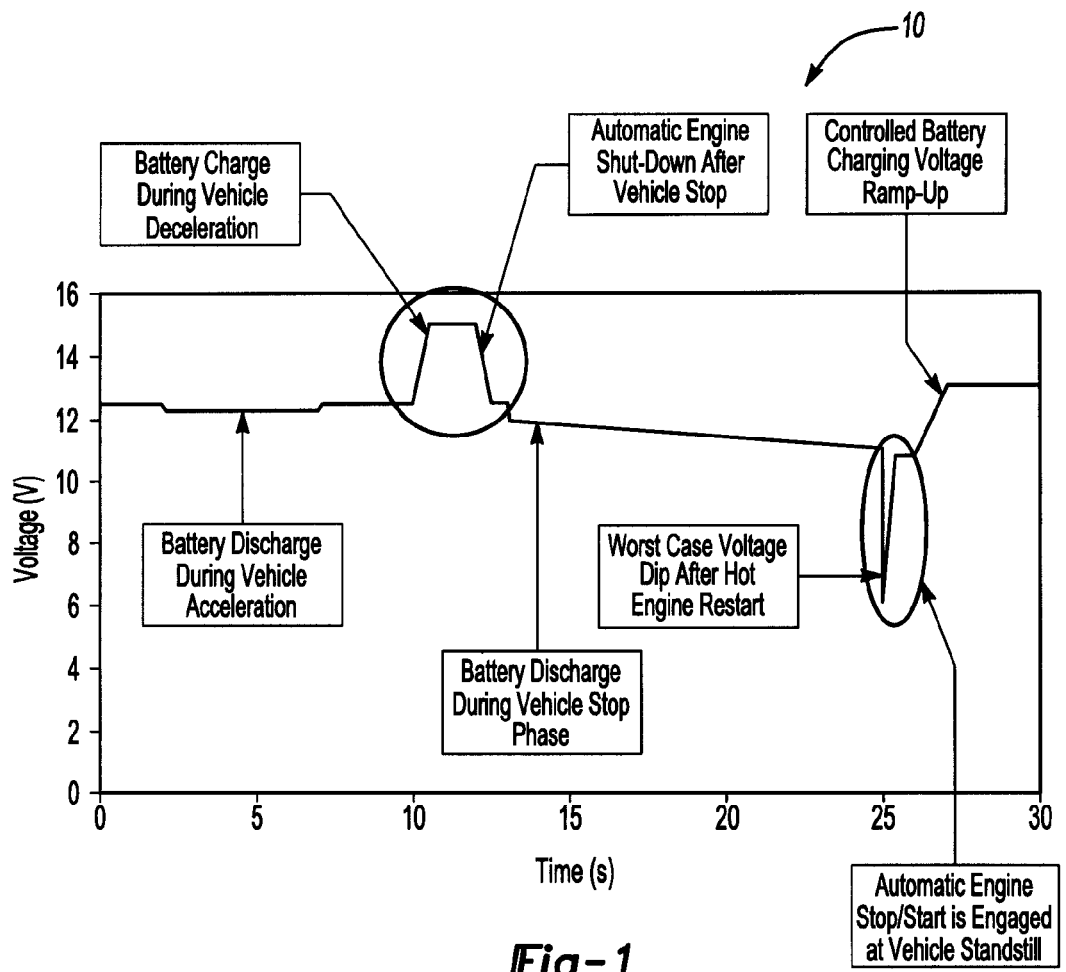
FIG. 1 illustrates a graph of electrical variations commonly associated with HEV and EV technology and its result on battery voltage.

FIG. 1 illustrates a graph 10 of electrical variations commonly associated with HEV and EV technology and its result on battery voltage. It can be seen that the battery voltage may vary between 6 and 16V. This can be problematic as some of the battery loads may experience disruption or other operational disruptions if such voltage variations were passes thereto.

Figure 2:
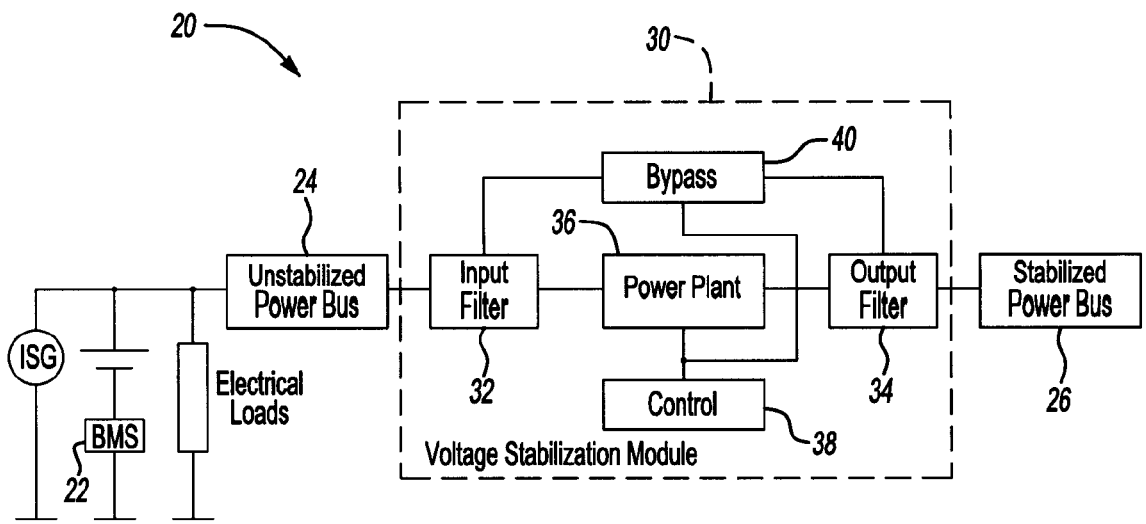
FIG. 2 illustrates a power distribution system in accordance with one non-limiting aspect of the present invention.

FIG. 2 illustrates a power distribution system 20 in accordance with one non-limiting aspect of the present invention. The system 20 may be configured to facilitate regulating voltage variation exposure of the various electrically sensitive load, i.e., those for which is may be desirable to provide a constant voltage (DC or AC). Optionally, the voltage regulating capabilities of the power distribution system 20 may be sufficient to maintain a constant or controllable 12V (or other voltage level) for the voltage sensitive loads.

The power distribution system 20 may be configured to facilitate distributing power form a battery 22 to any number of loads (not shown). The loads supplied by the battery 22 may be generally characterized as sensitive or insensitive loads. The sensitive loads may be loads of the type requiring or preferably operating with a relative constant power supply and the insensitive loads may be loads of the type having a broader range or less of a need for a constant power supply.

The loads on an unstabilized power bus 24, such as but not limited to an integrated starter generator (ISG), which may be used to facilitate start/stop control, and other electrical loads, like a cigarette lighter, seat motors, window lifter, may be less susceptible to voltage variation and suitable for receipt of a less stabile power supply, while the loads on a stabilized power bus 26 may be more susceptible to such voltage variations, such as rear seat entertainment, lighting system, and radio. The insensitive loads may be connected to the unstabilized power supply 24 and the sensitive loads maybe connected to the stabilized power supply 26.

The unstabilized power supply 24 may simply correspond with a power bus or other feature configured for deliver power directly to the insensitive loads. The stabilized power supply 26 may correspond with a similar power bus after power supplied thereto is stabilized with a voltage stabilization module 30. The voltage stabilization module 30, as described below in more detail, may be configured to facilitate stabilizing voltage levels and/or other electrical variations imparted to the more sensitive loads. The stabilizer 30 may be configured to stabilize the unstable voltage received from the unstable network 24, i.e., the portion left of the stabilizer, for an output to the voltage sensitive loads.

The stabilizer 30, in accordance with one non-limiting aspect of the present invention, may include an input filter 32 and an output filter 34 to filter or remove noise and other variables from the electrically transferred energy. A power plant 36 may be included for stabilizing/converting the incoming voltage to a stabilized voltage suitable for use with the voltage sensitive loads. The power plant 36 may be a DC/DC converter or other suitable device included to control voltage outputted to the sensitive loads.

A controller 38 may be included for regulating any number of operations of the power plant 36, such as to facilitate controlling the power plant 36 to provide the desired output voltage independently of variations of the input voltage. A bypass 40 may be included for bypassing the power plant 36. The bypass 40 may be controlled by the controller 38 and configured to electrically bypass the power plant 36 when the input voltage, i.e., that received from the unstable network 24, is suitable for use by the voltage sensitive loads. The bypassing of the power plant 36 in this manner may be useful in avoiding continuous losses and overstress of the power plant 36 by directing the unstable voltage directly to the sensitive loads.

FIG. 3 illustrates integration of an inverter system 50 with the power distribution system 20 in accordance with one non-limiting aspect of the present invention. The inverter system 50 may be one type of voltage sensitive or insensitive load connected to the right hand (output) side of power plant 36, i.e., connected to the stabilized power distribution bus 26. It may be configured to provide AC voltage to devices connected thereto, which may be a voltage sensitive load 52 operating at a voltage level greater than that provided by the battery 22. This class of load may be generally referred to as an appliance. An output of the inverter system 50 may be associated with a plug, cigarette lighter, and/or other feature included on a vehicle to supply AC voltage to another load connected thereto.

The inverter system 50 may be integrated within a junction box or other vehicle element associated with the power distribution system 20. The integration of the inverter system 50 with the power distribution system 20 may be advantageous in reducing system and component costs versus systems having separate and/or standalone features. The inverter system 50 may be of the type having capabilities for supporting domestic appliances or other AC operated elements which may be plugged into and/or included on the vehicle, such as but not limited to appliances like vacuum cleaners, televisions, radios, heaters, etc.

The inverter system 50 may include a DC/DC converter 54 connected to a DC/AC inverter 56. The DC/DC converter 54 may be controlled or pre-programmed to provide a constant DC voltage to the DC/AC inverter 56. The DC/AC inverter 56 may be configured to invert the constant DC voltage to a corresponding AC voltage suitable for power the AC load 52. The AC voltage may be selected to correspond with AC parameters commonly associated with powering U.S. and European appliances, i.e., 220Vac at 50 Hz for European appliances and 110Vac at 60 Hz for U.S. appliances. Of course, the present invention is not intended to be so limited and fully contemplates configuring the system to output AC signals according to various operating parameters.

The system 50 may include a smoothing capacitor 60 to smooth signals carried over the connection between the converter 54 and inverter 56. The system 50 may also include an output filter 62 to filter out noise and other variables associated with the outputted AC signal. The voltage level output to the load 52 may be fixed at the time of manufacturing or at some point thereafter by fixing operations of the converter 54 and inverter 56. Connecting the inverter system 50 to the stabilized power bus 26 allows the inverter system 50 to take advantage of the stabilized power supply so that it need not necessarily include additional controls and methodologies to insure the desired AC output.

In more detail, this uncontrolled inverter system 50, may fix the DC/DC converter 54 to boost the DC voltage of the stabilized power bus 26 to a voltage suitable for powering the desired appliances. The inverter 56 can be similarly fixed to convert the boosted DC voltage to an AC voltage suitable for power the desired appliances. The constant voltage to the converter 54 allows the operation of the both of the converter 54 and the inverter 56 to be fixed as it is presumed that both are provided with a constant voltage, thereby eliminating the need for corresponding amplitude control that otherwise would be required if the converter 54 were not receiving a constant voltage.

FIG. 4 illustrates a controlled inverter system 80 in accordance with one non-limiting aspect of the present invention. In contrast to the inverter system 50 shown in FIG. 3, the inverter system 80 shown in FIG. 4 may include corresponding elements (commonly numbered) and one or more controllers 82-84 to facilitate controlling the operations thereof. The illustrated controllers 82-84 are shown as standalone features but the functions described below with respect to the same may be integrated into a single controller or the controller 38 associated with the power distribution system 20.

The additional controllers 82-84 may be included to facilitate controlling the AC output of the inverter system 80. The system shown in FIG. 3, if the converter 54 and inverter 56 are fixed, is only able to provide one output voltage, such as but not limited to the 220Vac at 50 Hz for European appliances or a 110Vac at 60 Hz for U.S. appliances. The inverter system 80 shown in FIG. 4 allows the present invention to switch between two or more AC output voltages, such as to facilitate use of a universal inverter capable of supporting both of the European and U.S. appliances and there respective voltage differences.

The controllers 84-86 may receive feedback from the output of the converter 54 and/or the output of the inverter 56. This feedback may be used to adjust operating parameters of the converter 54 and/or inverter 56 in order to facilitate outputting the desired AC signal. The converter 54 may be controlled to output a constant DC voltage to the inverter 56, making it unnecessary to adjust inverter operations to compensate for voltage variances once the frequency adjustment of the inverter is programmed to process the constant DC voltage to the desired AC voltage. In this manner, the controls for the converter 54 and inverter 56 may be limited controllers in so far as the input voltages to both the converter 54 and inverter 56 are presumed to be fixed by way of the connection to the stabilized power bus 26 such that the respective controllers may need only control boost and frequency selection.

FIG. 5 illustrates a system of switching converter output in accordance with one non-limiting aspect of the present invention. The converter 54 may a push-pull style converter having multiple connection points 86-90 suitable for connecting to the inverter. A first set of connection points 86-88 may be suitable for providing 200Vdc to the inverter 56 and a second set of connection points 88-90 may be suitable for providing 400Vdc to the inverter 56 in order to support the DC voltages necessary to switch respectively between the U.S. and European loads.

A power relay 92 or other feature may be controlled to switch the inverter 56 between a 200Vdc bus to a 400Vdc of the converter 54. For the European and American power network, a first input of the inverter may connected to a +200Vdc terminal 88 of the converter. A second power input of the inverter may be switched between either be a 0Vdc terminal 86, which may be a tapped winding, or a −200Vdc terminal 90 of the converter. If an American network is required, the second input may be switched to the 0Vdc terminal 86, and if a European network is required, the second input may be switched to the −200Vdc terminal 90, which then provides +400Vdc to the inverter.

The fixed connections points 86-90 may be used to provide binary output control for the converter 54. The binary output control may relate to switching the output to support U.S. and European appliances. The configuration may limit feedback control and other controls in so far as only limited control is necessary to switch between the different output voltages. In particular, only limited control is needed to switch the relay 92 and only limited control is needed to adjust the duty cycle of the inverter 54 to support the different U.S. and European frequencies. This limited control may be limited to switching outputs of the converter 54 and inverter 56 without the need to monitor the corresponding outputs, i.e., without having the manage the converter output voltage or the inverter output frequency or use feedback to adjust the same.

In a low-medium class car, there may be less of an interest in providing the foregoing capability to switch between U.S. and European loading networks. The foregoing may then be adjusted to compensate for this need with the above-noted uncontrolled design and/or fixing the controlled design in so far as the converter may be fixed to provide either the 200Vdc or 400Vdc. The controlled, fixed arrangement, however, may still be advantageous to vehicle manufacturers in so far as the manufacture may experience some cost saving by including a single reference for transformer, coils, capacitor, and Mosfets which are common to both the U.S. and European arrangements.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle power system for use in a vehicle having a battery configured to output an unstablized DC voltage to an unstablized power bus, the unstabilized DC voltage varying within a broad voltage range depending on operating conditions of the vehicle, and one or more insensitive loads connected to the unstabilized power bus, the one or more insensitive loads being operable throughout the broad voltage range, the system comprising:

a voltage stabilization module having a converter operable to stabilize the unstabilized DC voltage output from the battery into a stabilized DC voltage and to output the stabilized DC voltage to a stabilized power bus, the stabilized DC voltage being substantially constant regardless of the vehicle operating conditions;

the voltage stabilization module being operable to output the stabilized DC voltage to one or more sensitive loads connected to the stabilized power bus, the one or more sensitive loads being operable within a narrow voltage range and throughout any voltage variations in the stabilized voltage bus, the operation of the one or more sensitive loads being disrupted, rendering the one or more sensitive loads inoperable, in the event voltage variations are outside of the narrow voltage range and within the broad voltage range; and the voltage stabilization module including a bypass operable to automatically bypass the converter such that the unstabilized DC voltage is provided to the stabilized voltage bus without passing through the converter in the event the unstabilized voltage is within the narrow voltage range.

2. The system of claim 1 further comprising an inverter connected to the stabilized power bus, the inverter being operable to convert the DC voltage of the stabilized power bus to an AC voltage suitable for powering U.S. appliances, and wherein the bypass is separate from the converter.

3. The system of claim 1 further comprising an inverter connected to the stabilized power bus, the inverter being operable to convert the DC voltage of the stabilized power bus to an AC voltage suitable for powering European appliances.

4. The system of claim 1 further comprising a controller operable to control the bypass between a first state and a second state depending on whether the unstabilized DC voltage is within the narrow voltage range, the first state corresponding with the unstabilized DC voltage being within the narrow voltage range and the unstabilized DC voltage bypassing the converter, the second state corresponding within the unstabilized DC voltage being outside of the narrow voltage range and the unstabilized DC voltage being stabilized by the converter.

5. The system of claim 4 wherein the controller determines the unstabilized voltage to be outside of the narrow voltage range and actuates the bypass to the second state when vehicle operating conditions indicate at least one of:

(a) battery discharging during vehicle acceleration;
(b) battery charging during vehicle deceleration; and
(c) automatic engine stop/start at vehicle standstill.

6. The system of claim 4 wherein the controller determines whether the unstabilized voltage is within the narrow voltage range without measuring the unstabilized voltage.

7. The system of claim 4 wherein the controller determines whether the unstabilized voltage is within the narrow range based at least in part on vehicle acceleration and deceleration.

* * * * *